B. BEVELANDER.
MECHANISM FOR WINDING AND REELING ROPE OR CORDAGE.
No. 190,811. Patented May 15, 1877.
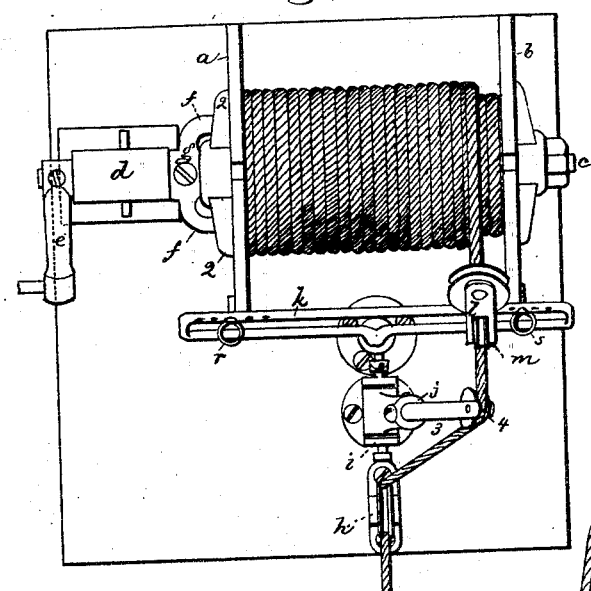
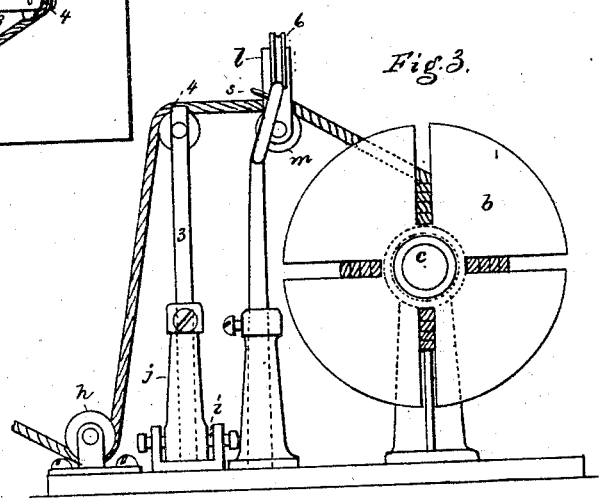
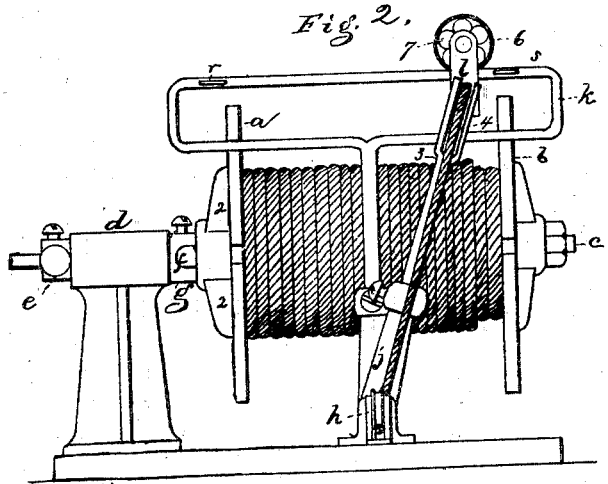
Witnesses.
L. H. Latimer.
W. J. Pratt.
Inventor:
Benjamin Bevelander
per Crosby & Gregory attys.

UNITED STATES PATENT OFFICE.

BENJAMIN BEVELANDER, OF BOSTON, MASSACHUSETTS.

IMPROVEMENT IN MECHANISMS FOR WINDING AND REELING ROPE OR CORDAGE.

Specification forming part of Letters Patent No. 190,811, dated May 15, 1877; application filed November 27, 1876.

*To all whom it may concern:*

Be it known that I, BENJAMIN BEVELANDER, of Boston, in the county of Suffolk and State of Massachusetts, have invented Improvements in Mechanism for Winding and Reeling Rope and Cordage, of which the following is a specification:

This invention has reference to devices to reel or wind ropes or cordage; and consists in the combination, with a traversing guide and reel, of a vibrating leader to move with and present the rope or cord to the guide.

Also, in the combination, with the reel traversing guide and leader, of a pulley located at or near the pivot of the leader, to operate as hereinafter described.

Figure I represents a top view of my invention; Fig. 2, a side view thereof, and Fig. 3 an end view.

The reel, composed of heads $a$ $b$, and, preferably, a collapsible barrel, (shown in dotted lines, Fig. 3,) is mounted upon a shaft, $c$, sustained, as shown in this instance, in a bearing, $d$, the shaft and reel being rotated by a handle, $e$. This shaft $c$ may be a part of a rope-making machine, and be operated in any usual way. Arms $f$ $f$ of a collar, $g$, secured to shaft $c$, engage portions 2 of the head $a$, and cause the reel to move with the shaft, the arms and portions 2 acting as a clutch.

A sheave, $h$, is placed at or near the axis $i$ of the leader $j$, it being a pivoted arm, having an adjustable extension, 3, provided with a sheave, 4, and arranged to vibrate in the plane of a circle parallel with the guide-rods $k$, placed substantially parallel with the axis of the reel.

The guide $l$ is caused to traverse over these guide-rods by the action of the strand being wound against a strand previously wound into coil form. The upper roller 6 will be preferably made as an annulus, supported on anti-friction rollers 7, and it will be moved and roll from end to end of the guide $k$. The guide is provided with a sheave, $m$. The rope to be wound is led under sheave $h$ and over sheaves 4 and $m$ to the reel. If the rope being wound passed from the sheave $h$ over sheave $m$ to the reel the rope would be pressed with great force about the sheave $m$, for, to wind the rope closely and firmly, so that it can be retained safely in coil form, it must be wound under great tension. This strong tension is also necessary in order to insure that the strand tangential to the coil of rope or the reel shall be pressed laterally by the preceding wound coil. With such an arrangement as supposed the guide would produce so much friction on the guide-rods that it could not operate with certainty.

By placing the leader and its sheave in an intermediate position, as described, it receives the principal portion of the strain of the rope necessary to be exerted to wind it closely into coil form, and the guide and sheave $m$ are relieved from much strain, and the guide is left in condition to move easily by reason of its pulley 6 along the guide-rods. The sheave 4 will always be preferably a little above or on the level with the sheave $m$.

In this way it will be seen that the surface about which the rope is held under strong tension is a rolling-surface, that it vibrates in the arc of a circle, and that the pressure of the rope upon the sheave $m$ is substantially uniform throughout its movement.

The rope always passes from the sheave 4 over sheave $m$, and to the reel, in a line tangential and substantially at right angles to the axis of the reel. The guide is really moved by strain upon the rope at back and front of the guide, the strain in front of the guide, caused by the action of the strand being wound against the previous coil, determining, however, the direction of vibration of the leader.

The chord of the arc in which the leader-sheave vibrates will be preferably as long, if not longer than the length of the rope-receiving portion of the reel. Just as, or before, the rope reaches the end of the reel, so that it would bear along the inner face of the heads $a$ or $b$, the guide meets an adjustable stop, $r$ or $s$, which stops the guide and turns the strand toward the center of the reel preparatory to its being moved in the opposite direction. This prevents the possibility of superimposing several consecutive coils, one upon the other at the end of the reel.

The guide-bars and leader are vertically adjustable to adapt them to reels of different sizes.

I claim—

1. The combination, with the reel and traversing-guide, of the vibrating leader, adapted to move with and present the rope to the sheave of the guide, substantially as described.

2. The combination, with the reel, traversing guide and leader, of a pulley, located at or near the pivotal point of the leader, to operate substantially as described.

In testimony whereof I have signed my name to this specification in the presence of two subscribing witnesses.

BENJAMIN BEVELANDER.

Witnesses:
G. W. GREGORY,
W. J. PRATT.